July 16, 1935.  G. W. HAURY  2,008,101

VALVE WASHER

Filed Feb. 8, 1934

Inventor
George W. Haury
by Rummler, Rummler & Woodworth
his attys.

Patented July 16, 1935

2,008,101

UNITED STATES PATENT OFFICE 2,008,101

VALVE WASHER

George W. Haury, Chicago, Ill.

Application February 8, 1934, Serial No. 710,287

4 Claims. (Cl. 251—46)

This invention relates to improvements in valve washers, and particularly compression valve washers having resilient means for frictionally securing them in a bore in a reciprocable valve stem.

Valve washers arranged to be resiliently secured in the bore of a valve stem have for some time been known, but, as heretofore constructed, such washers have a disadvantage in that sufficient tension can not readily be provided in the securing means so as to engage the bore of the valve stem with sufficient force to prevent the washer from dropping out of the valve stem or being pulled out due to sticking of the valve washer against the valve seat. Primarily it is to overcome this difficulty that the herein described valve washer was devised.

The main objects of this invention are to provide a valve washer having its own individual securing means arranged to function as an elliptical spring for laterally engaging the bore of a valve stem; to provide such a washer having an imperforate seat engaging face and arranged to rotate freely upon its resilient securing means; and to provide a valve washer having a yieldable seat engaging face and a backing member arranged to resiliently cushion said face directly opposite the points of contact thereof with a valve seat.

A specific embodiment of this invention is shown in the accompanying drawing, in which.

Figure 1:
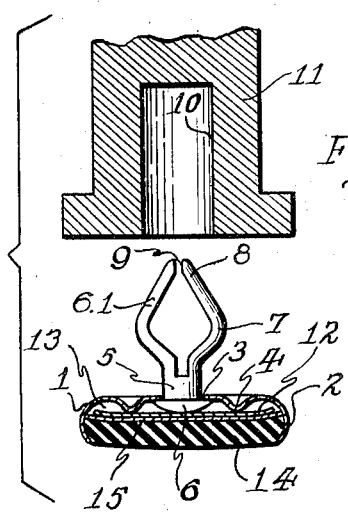
Figure 1 is a sectional elevation showing the valve end of a valve stem together with an improved valve washer.

In the form shown in the drawing, my improved valve washer comprises a flanged metallic shell having a central aperture and a headed longitudinally split securing member extending through said aperture with its head disposed on the flanged side of the shell, a marginally resilient metal disc disposed over the head of the securing means and a resilient washer or gasket member positioned against the said disc and secured by lateral engagement with the said flange, the projecting portions of the split securing means being outwardly and oppositely bowed intermediate their ends and then converging toward each other so that the ends substantially contact each other.

Figure 2:
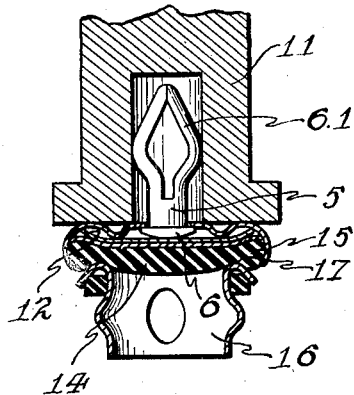
Fig. 2 is a sectional elevation showing the valve washer applied to a valve stem and engaging a valve seat.
Figure 4:
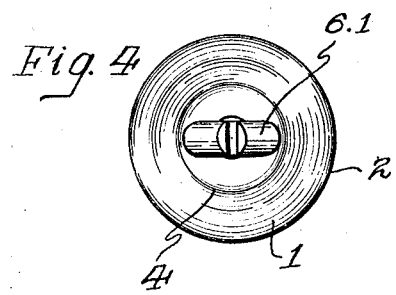
Fig. 4 is a top plan view of an improved valve washer.
Figure 3:
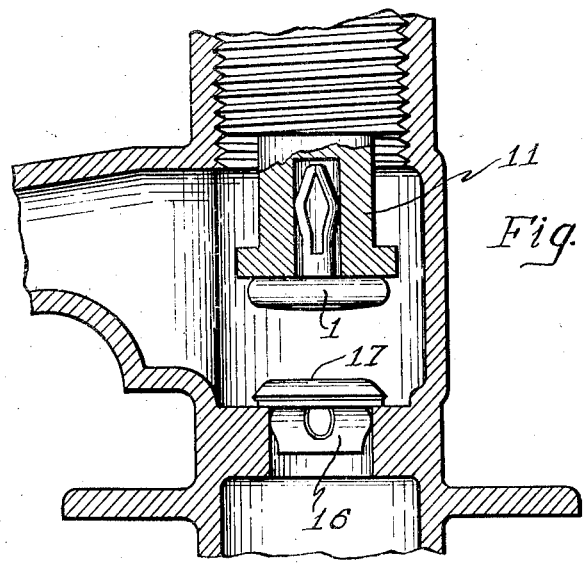
Fig. 3 is a fragmentary sectional view of a compression valve including an improved valve washer and showing the relationship of the various parts.

As shown in Figs. 1 and 2, the shell 1 comprises an inverted circular pan having an annular marginal flange 2, the said shell being preferably made of a relatively thin pliable metal and having a centrally disposed aperture 3 and a downwardly extending annular rib 4 surrounding the said aperture 3, the flange 2 having its margin rolled slightly inwardly. A headed longitudinally split rivet or securing means 5 is inserted through the aperture 3 so that the headed end 6 is disposed against the shell 1 on the side from which the flange 2 projects.

After having been inserted in the aperture 3, the extending arms or members 6.1 of the split securing means are each bowed outwardly intermediate their ends as at 7, and the outer ends 8 are brought toward each other so that they are almost in contact, the adjacent surfaces of the ends 8 being substantially flattened as at 9 to provide a bearing surface for each other or a mutual support when brought into contact as will be hereafter explained.

As shown in Figure 1, the resilient arms of the securing means 5 are bowed outwardly to such an extent that the distance between the crests of the bowed portions is substantially greater than the diameter of the bore 10 in the valve stem 11 to which the valve washer is to be applied.

On the opposite side of the shell 1 a resilient metallic disc 12 is disposed over the head 6 of the securing means 5 and rests upon the annular rib 4 so that its margin is cantilevered on the rib 4 and into the space 13 between the rib 4 and the flange 2. A resilient imperforate gasket or seat engaging washer 14 is then disposed against the disc 12 and is secured by engagement with the margin of the flange 2.

In the form shown in Figure 1, a gasket or seat engaging washer made of rubber is shown, and such rubber washer is preferably provided with a canvas backing 15 which is secured to the washer by any suitable means.

In the use and operation of the valve washer, the resilient bowed extensions or arms 6.1 of the securing means 5 are inserted into the bore 10 of the stem 11, and the washer is pushed toward the stem until the back of the shell engages the end of the stem as shown in Figure 2. This results in the arms 6.1 being compressed inwardly until the surfaces 9 at the ends of the arms come into engagement with each other, and then flattening of the bowed portions 7 sufficient to permit their entry into the bore. Thus each arm of the securing member 5 functions as a semi-elliptic spring and tends to force the bowed portion 7 against the sides of the bore 10.

Such outward pressure of the bowed portions 7 against the wall of the bore 10 is very much greater than any force that can be exerted by the cantilever spring arrangement of the devices heretofore in use, and the valve washer is securely held in its proper position against the end of the valve stem regardless of whether the bore 10 is smoothed or threaded.

With this arrangement, the holding force of the resilient arms 6.1 is such as to require a considerable force to pull the washer out of engagement with the stem, a much greater force than would be exerted by any sticking between the valve washer and the seat 16 even though the seat or the face of the valve washer became gummy or sticky due to impurities in the medium passing through the valve opening.

When the face of the valve washer is brought into contact with the annular seat 16, the annular crest 17 is forced against the resilient washer 14 and tends to compress the same upwardly toward the back of the shell 1. This action forces the resilient margin of the metal disc 12 upwardly into the space 13, and the margin of the disc 12 being cantilevered on the rib 4 provides a resilient cushion for the engagement of the washer 14 with the valve seat and tends to make such engagement more secure.

In order to accomplish this result, the valve washers are provided in a series of sizes suitable for various sizes of valve seats, and each valve washer is proportioned so that the diameter of the annular rib 4 will be smaller than the diameter of the valve engaging portion 17 of the seat with which the washer is to be used. Thus when the proper size of washer is used with a certain valve seat, the cushion action of the cantilevered margins of the disc 12 will be obtained.

In the manufacture of the herein described valve washers, the gasket 14 is pressed into the shell 1 after all of the other washer elements have been assembled and the flange 2 given its slight inward contraction as shown in Figures 1 and 2. As the gasket 14 is pressed into the shell, the margins of the disc 12 are sprung inwardly slightly as shown in Figure 1, and as the pressure required to force the gasket 14 into the shell is released, the cantilever spring action of the margin of the disc 12 tends to force the margin of the gasket 14 somewhat laterally against the inwardly contracted flange 2, thus gripping and securing the gasket in position within the flange of the shell 1.

The particular advantages of my improved valve washer are in the construction of the resilient securing means which provides a much greater gripping action than is had with previous arrangements, and positively prevents the valve washer from dropping or pulling out of the valve stem; the spring cushion effect provided by the metal disc backing for the seat engaging gasket which provides a slight yield after the valve is seated, and assures a tight sealing of the valve opening; and the fact that a resiliently soft, yieldable, imperforate gasket may be employed without danger of being distorted or punctured by the head of the securing means, such protection being provided by the metallic disc between the gasket and the head of the securing means.

A further advantage of my improved washer construction is that the washer is suspended from the head of the securing means in such a way that it is free to rotate relative to the securing means and thus eliminate the danger of scoring or tearing the gasket should it be brought into contact with a worn or water cut valve seat.

Although but one specific embodiment of this invention is herein shown and described, it will be understood that details of the construction shown may be altered or omitted without departing from the spirit of this invention as defined by the following claims:

I claim:

1. A compression valve washer comprising a pan-like shell having a marginal flange, an annular rib on said shell disposed on the flanged side thereof and spaced inwardly from said flange, a resilient metal disc disposed against said rib and arranged with its margin extending laterally beyond said rib, a gasket disposed against said disc and secured in said shell by engagement with said flange, and a securing means extending axially from the opposite side of said shell and arranged to engage a valve stem.

2. A compression valve washer comprising a pan-like shell having a marginal flange and a central aperture, a headed securing means extending axially through said aperture and beyond said shell, the head of said securing means being disposed on the flanged side of said shell, an annular rib on the flanged side of said shell and spaced inwardly from said flange, a resilient disc disposed against said rib and having its margins extending laterally beyond said rib, and a gasket disposed against said disc and held in said shell by engagement with said flange, said securing means comprising axially projecting arms bowed oppositely outward intermediate their ends and converging beyond the bowed portions to substantially engage each other.

3. A compression valve washer having a projecting resilient securing means arranged to be received in the bore of a valve stem, said means comprising members bowed outwardly intermediate their ends and provided with substantially straight outer converging portions having their outer terminals arranged in close proximity, whereby when the bowed portions are inserted in the bore of the valve stem and engaged with the walls of the bore the members will be mutually supported at their outer ends.

4. In a compression valve comprising a valve stem arranged to carry a valve washer on one end and having an axial bore in said end, a valve washer having a projecting resilient securing means arranged to be received in said bore, said means comprising members bowed outwardly intermediate their ends and converging beyond the bowed portions with their outer terminals arranged in close proximity, said members being formed to have a greater outside width across the bowed portions than the sum of the diameter of said bore and the distance between said outer terminals, whereby when the bowed portions are inserted in said bore and engaged with the walls thereof, the said terminals will be mutually engaged and supported one by another.

GEORGE W. HAURY.